J. COLLINGE.
LIQUID SPRINKLING APPARATUS.
APPLICATION FILED JULY 28, 1910.
984,350.
Patented Feb. 14, 1911.
2 SHEETS—SHEET 1.
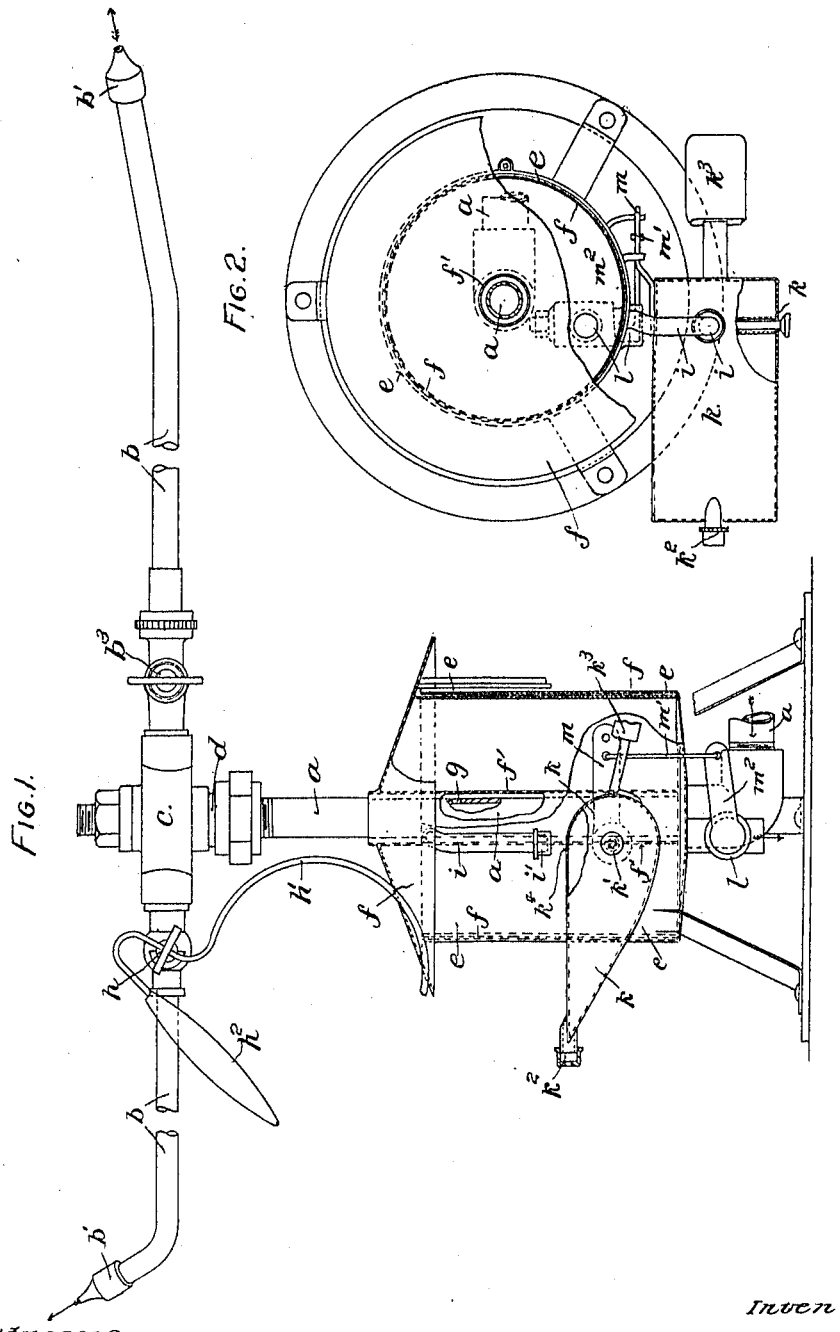

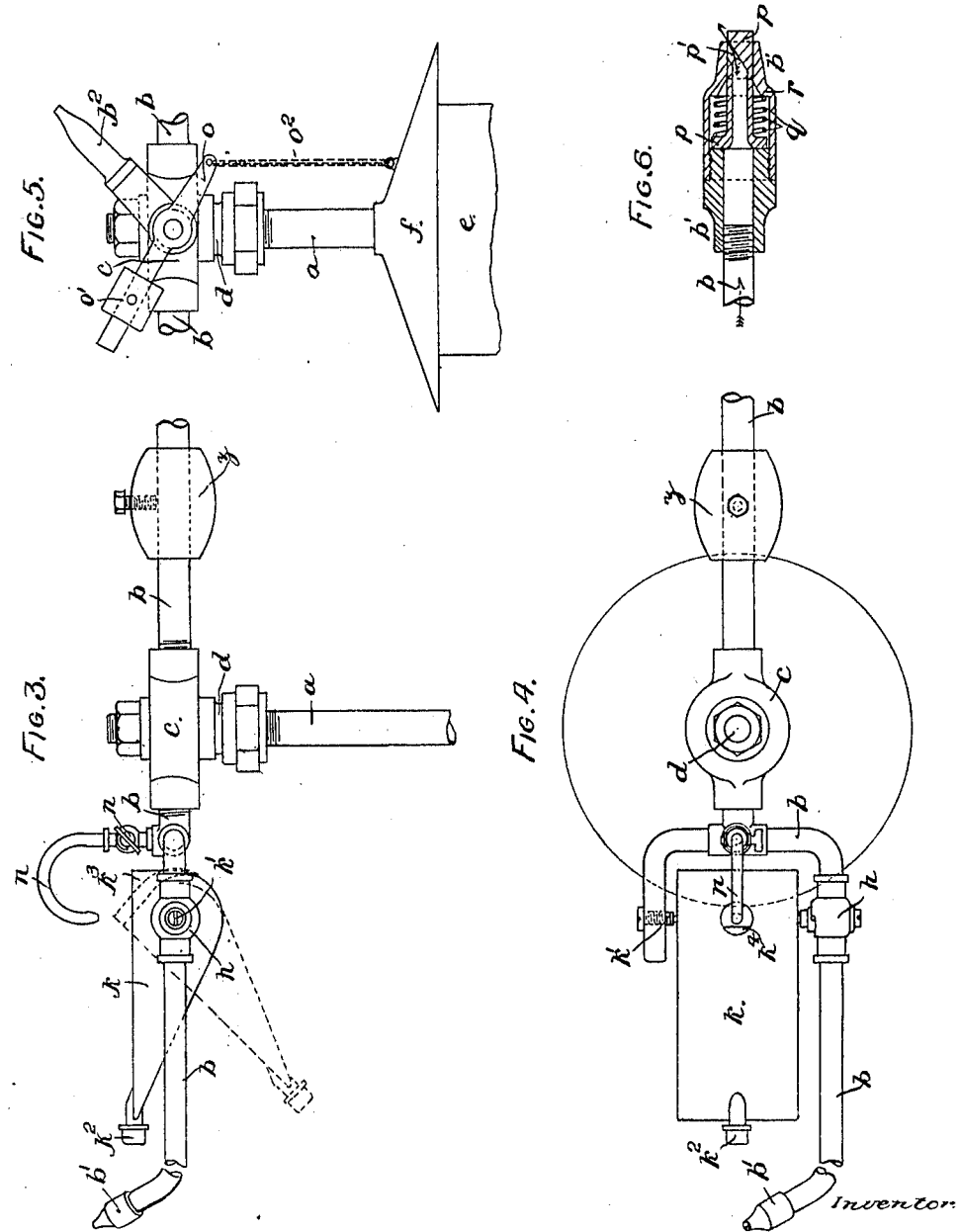

UNITED STATES PATENT OFFICE.

JOSEPH COLLINGE, OF BIRKDALE, ENGLAND, ASSIGNOR OF ONE-HALF TO THOMAS MATTHEW CREAK, OF BIRKDALE, ENGLAND.

LIQUID-SPRINKLING APPARATUS.

984,350.

Specification of Letters Patent.

Patented Feb. 14, 1911.

Application filed July 26, 1910. Serial No. 573,853.

*To all whom it may concern:*

Be it known that I, JOSEPH COLLINGE, a subject of the King of England, residing at Birkdale, in the county of Lancaster, England, have invented certain new and useful Improvements in Liquid-Sprinkling Apparatus, of which the following is a specification, reference being had therein to the accompanying drawing.

This invention has reference to liquid sprinkling apparatus, such as for spreading or sprinkling water over lawns, or distributing sewage liquors or the like; and it has for its object primarily to provide an apparatus of the rotary kind, by which the quantity delivered at all radii from the apparatus, per unit of area, shall be as far as possible equal; and in addition, the distribution of liquid shall be of a form and quantity which will be readily absorbed by the earth or substance over which it is distributed.

The invention will be described with the aid of the accompanying drawings, which illustrate a liquid sprinkling apparatus in which the improvements hereunder are comprised; and with regard to the invention claimed as novel, this is set out in the statement of claim concluding the specification, the features or characteristics covered by the respective claims, where comprising two or more parts or features, being for the said features or parts in combination and not separately.

In the drawings, Figure 1 is an elevation partly in section showing the apparatus; and Fig. 2 is a plan of this apparatus partly in section. Figs. 3 and 4 are, respectively, elevation and plan of a slightly modified form of apparatus; Fig. 5 is an elevation showing another modification, and Fig. 6 a detail hereinafter referred to.

In this apparatus, the water is supplied to the rotating arms and nozzles thereon through a central conduit, and a supply from the commencement is adapted through hydraulic appliances such as herein described, by water supplied to same in regulated quantities, to cut off the supply more or less, and subsequently to turn it on again; and this cutting off is effected in some cases gradually.

With regard to the arrangement shown in Figs. 1 and 2 in which the improvements are comprised, $a$ represents the water supply pipe, and $b$ are the revolving arms with distributing nozzles $b^1$ on their tips; these arms being carried on a socket or boss $c$ which will revolve on a plug $d$ fixed on the upper end of the supply pipe $a$, the plug and boss being provided with suitable apertures so that the water can freely flow from the pipe $a$ to the arms $b$. In connection with the pipe $a$ there is provided a vessel $e$ (which, in the case shown, is concentric with the stand pipe $a$), in which a bell floater $f$ is disposed and works, and to which water in a regulated quantity from the said stand pipe is supplied; in the case shown this being effected through a small hole $g$ in the pipe, through which water passes from the stand pipe into the bell $f$ by way of the annular space between the pipe $a$ and the tube $f^1$ of the bell $f$ which surrounds the pipe $a$, the water passing into the bell under the lower edge of the tube $f^1$. Thus when water is turned on— assuming the vessel to be empty—the bell floater $f$ is gradually lifted by the water which enters the vessel $e$ through the hole $g$; and the lifting of this bell floater is arranged to act upon a tap or cock $h$ on one of the arms $b$ through a member $h^1$; and as it— the bell floater—rises, it gradually and slowly shuts off some of the supply of water to one of the tubular arms $b$, and so the pressure on the delivery side, namely, that in one of the nozzles $b^1$, is gradually reduced, and the radius to which this jet of water will be thrown, will correspondingly be diminished until the floater has reached its uppermost position. The pressure in the other arm $b$ and nozzle will increase as the valve $h$ is closed. When the water in the vessel $e$ has risen to a certain level, say the level at which the floater will be at the top of its stroke, it overflows therefrom by a pipe $i$ with a regulating nozzle $i^1$ on it, into a counterbalanced pivoted tipping pan or device $k$, which, when it becomes filled to a certain extent, will be overbalanced by the water on one side of its pivot $k^1$, and it will fall down on that side, and the water will be discharged from it through a regulated opening or nozzle $k^2$. When this tipping action takes place, a valve or cock $l$ is opened by it through a lever $m$, a rod $m^1$, and lever $m^2$, and the contents of the vessel $e$ are quickly discharged, whereupon the floater $f$ falls correspondingly quickly, and the weight $h^2$ on the tap $h$ quickly turns on the water again to the tubular arm $b$, and the operation in this arm recommences; that in the other arm $b$ being constant. When the tipping basin $k^1$ has discharged its contents, the weight $k^3$ on it brings it back to its normal position, and so closes the tap or cock $l$. One of the nozzles $b^1$ of the arms $b$ referred to, is disposed preferably upwardly and at an inclination rearwardly, so that it directs the jet upward as well as rearward; while the other arms and nozzle are adapted to give a constant supply, and have a radial water distributing action, and assists in the rotative action; while the supply and pressure and force of the water are governed by the tap $b^3$ upon it. By these means and mode of action, the distribution of water per unit of area is uniform and it falls in the form of natural rain.

Referring to the Figs. 3 and 4, the cock or valve on the rotating arm $b$, preferably that fitted with the rearwardly extending arm, is actuated by a tipping or timing bucket or member $k$ carried by the arm itself, such bucket being adapted to be filled by a pipe $n$ with a regulating tap $n^1$ on it also carried on the said arm $b$. This arm $b$, as will be seen in Fig. 4, is in the form of a bracket, and is adapted to support the tipping or timing member within it, the bearing pin on one side of the bucket constituting a part of the valve $h$ controlling the supply of water to the nozzle of the arm $b$. The tipping member $h$ is more or less closed, and is provided with a filling aperture $k^4$ arranged to come below the nozzle of the pipe $n$ when the member $k$ is in the normal or filling position, and with an emptying nozzle $k^2$. The tipping member $k$ is also provided with a weighted portion $k^3$ for returning it to the normal position after its discharge. To balance the arm $b$, tipping or timing members $k$ and other parts, an adjustable weight $z$ is fitted on the other arm $b$ on the opposite side of the central support.

In the modification illustrated in Fig. 5, a supplemental distributing nozzle $b^2$ is used and adapted to be operated by the floater or bell $f$ for the purpose of varying the angle thereof to the general plane of the rotatable arms, for the equal distribution of water, as above referred to. To effect this variation of the angle or pitch of the nozzle, it is adapted to oscillate on the side of the boss $c$, on a pivot and to be operated by an arm or lever $o$ fitted with a weight $o^1$ at one end, and connected at the other end by a flexible connection $o^2$ to the bell floater $f$. The action is, so far as the bell is concerned, the same as hereinbefore described; and as regards the operation of the lever $o$, the weight $o^1$ on the lever $o$ effects the tilting in one direction of the latter, as well as the nozzle; while the downward movement of the bell effects the tilting in the opposite direction. By varying the pitch or angle of the nozzle in this manner, the spray produced by the nozzle $b^2$ is thrown a greater or lesser distance from the axis of the rotation of the arms $b$, with the effects above referred to. The nozzle device $b^2$ may be used together with the nozzles $b^1$, or separately.

As a means of regulating the force of the water issuing from the nozzle and thus enable the area sprayed to be more or less the same, no matter what pressure of water is supplied, the nozzle is provided or fitted with an arrangement such as shown in Fig. 6, whereby the pressure of the water is automatically controlled. This controlling device consists of a spring controlled tubular extension $p$, which is held in contact with the end of the nozzle $b^1$ by a spring $q$ inclosed in a nozzle shaped casing $r$, and connected with the said nozzle $b^1$ by screwing or otherwise. When the tubular extension is in position within the nozzle casing $r$, an orifice $p^1$ projects partly beyond the orifice of the nozzle casing $r$, and permits the water to escape therefrom. Should the water pressure be comparatively great, the spring will be compressed, and the opening of the bore $p^1$ enlarged by the extension $p$ being pressed out a greater distance from the nozzle casing by the water pressure, whereupon the water will be caused to issue therefrom at the same velocity as when not so much open. Hence, no matter what the pressure of the supply is, a constant area will be sprayed equally all over.

What is claimed is:—

1. An apparatus for sprinkling and distributing liquids at varying distances from the apparatus comprising a valve controlled sprinkling and distributing nozzle, a liquid supply source, and a tiltable receptacle, which is actuated by liquid from the supply source, and controls the valve which regulates the supply of liquid to the sprinkling and distributing nozzle, and comprises an unbalanced and closed vessel having an inlet orifice in its upper wall and an outlet nozzle.

2. An apparatus for sprinkling and distributing liquids at varying distances from the apparatus comprising a valve controlled sprinkling and distributing nozzle, a liquid supply source, and a tiltable receptacle, which is actuated by liquid from the supply source, and controls the valve which regulates the supply of liquid to the sprinkling and distributing nozzle, and comprises a pivotally mounted closed vessel provided with an adjustable weight at one end, and an adjustable outlet at the other, and has an inlet orifice formed in its upper wall.

3. An apparatus for sprinkling and distributing liquids at varying distances from the apparatus comprising an automatically actuated tiltable receptacle, a rotatable spraying arm having a valve controlled outlet, and means disposed between the receptacle and valve whereby the valve is actuated when the receptacle is tilted.

4. An apparatus for sprinkling and distributing liquids at varying distances from the apparatus comprising a liquid supply source, an unbalanced tiltable receptacle which is actuated by liquid from the supply source, a float container which is filled with liquid from the supply source, a float actuated by liquid in the float container, a liquid sprinkling arm having a nozzle, a valve controlling the supply of liquid to the nozzle of the said arm, means interposed between the nozzle controlling valve and the float whereby the valve is actuated, and a valve which is actuated by the tiltable receptacle and regulates the outlet of the water from the float container.

In testimony whereof I affix my signature in presence of two witnesses.

JOSEPH COLLINGE.

Witnesses:
 THOMAS MATTHEW CREAK,
 SOMERVILLE GOODALL.